United States Patent
Fischer et al.

(10) Patent No.: US 12,224,400 B2
(45) Date of Patent: Feb. 11, 2025

(54) LITHIUM/SULPHUR ELECTROCHEMICAL CELL

(71) Applicant: SAFT, Levallois-Perret (FR)

(72) Inventors: Florent Fischer, Bruges (FR); Thierry Hezeque, Aubie Espessas (FR); Christian Jordy, St Louis de Montferrand (FR)

(73) Assignee: SAFT, Levallois-Perret (FR)

( * ) Notice: Subject to any disclaimer, the term of this patent is extended or adjusted under 35 U.S.C. 154(b) by 1169 days.

(21) Appl. No.: 17/044,482

(22) PCT Filed: Apr. 9, 2019

(86) PCT No.: PCT/EP2019/058969
§ 371 (c)(1),
(2) Date: Oct. 1, 2020

(87) PCT Pub. No.: WO2019/197410
PCT Pub. Date: Oct. 17, 2019

(65) Prior Publication Data
US 2021/0151802 A1    May 20, 2021

(30) Foreign Application Priority Data
Apr. 11, 2018  (FR) ...................................... 1853161

(51) Int. Cl.
*H01M 10/0569* (2010.01)
*H01M 4/02* (2006.01)
(Continued)

(52) U.S. Cl.
CPC ....... *H01M 10/0569* (2013.01); *H01M 4/382* (2013.01); *H01M 4/405* (2013.01);
(Continued)

(58) Field of Classification Search
None
See application file for complete search history.

(56) References Cited

U.S. PATENT DOCUMENTS

2003/0113627 A1* 6/2003 Choi ..................... H01M 4/136
429/232
2015/0084603 A1* 3/2015 Thillaiyan ............. H01M 10/44
429/188

FOREIGN PATENT DOCUMENTS

CN    102668232 A  *  9/2012  ............ H01M 10/05
CN    102903887 A     1/2013
(Continued)

OTHER PUBLICATIONS

English language machine translation of CN-102668232-A, (Year: 2023).*
(Continued)

*Primary Examiner* — Eli S Mekhlin
(74) *Attorney, Agent, or Firm* — Sughrue Mion, PLLC

(57) ABSTRACT

A lithium/sulfur electrochemical element (1) comprising: a cathode (2) comprising: i) carbon having a porous structure (5) comprising pores with a mean diameter less than or equal to 6 nm; ii) sulfur having a degree of oxidation between 0 and −2 in the pores of the carbon; b) an electrolyte comprising: i) at least one organic solvent which is a carbonate; ii) one or more salts, at least one salt being lithium bis (fluorosulfonyl)imide; c) an anode (4) comprising lithium metal or a metallic alloy of lithium. Such an element provides increased safety of use because it limits the quantity of hydrogen sulfide that can be emitted in the event of an electrolyte leak or in the event of exposure of an electrode of the element to water.

19 Claims, 2 Drawing Sheets

(51) Int. Cl.
    *H01M 4/38*     (2006.01)
    *H01M 4/40*     (2006.01)
    *H01M 4/62*     (2006.01)
    *H01M 10/052*     (2010.01)
    *H01M 10/0568*     (2010.01)

(52) U.S. Cl.
    CPC ......... *H01M 4/625* (2013.01); *H01M 10/052* (2013.01); *H01M 10/0568* (2013.01); *H01M 2004/021* (2013.01); *H01M 2300/0037* (2013.01)

(56) References Cited

FOREIGN PATENT DOCUMENTS

| | | | |
|---|---|---|---|
| DE | 11 2015 005 161 T5 | 8/2017 | |
| EP | 2317595 A1 * | 5/2011 | ........ H01M 10/0525 |
| JP | 2015-115270 A | 6/2015 | |
| WO | 2012/100301 A1 | 8/2012 | |
| WO | 2016/192111 A1 | 12/2016 | |

OTHER PUBLICATIONS

Sigma Aldrich Material Safety Data Sheet for Ethylene Carbonate. (Year: 2023).*
Sigma Aldrich Material Safety Data Sheet for Dimethyl Carbonate. (Year: 2023).*
Chen et al., Electrochimica Acta 282 (2018) 555-562. (Year: 2018).*
International Search Report for PCT/EP2019/058969 dated Jun. 19, 2019 [PCT/ISA/210].

* cited by examiner

LITHIUM/SULPHUR ELECTROCHEMICAL CELL

CROSS REFERENCE TO RELATED APPLICATIONS

This application is a National Stage of International Application No. PCT/EP2019/058969 filed Apr. 9, 2019, claiming priority based on French Patent Application No. 1853161 filed Apr. 11, 2018.

TECHNICAL FIELD

The technical field of the invention is that of lithium/sulphur rechargeable electrochemical cells.

STATE OF THE ART

The term "cell" used below designates an electrochemical cell. The terms "cell" and "electrochemical cell" are used interchangeably below.

A lithium/sulphur (Li/S) cell is known in the state of the art. It typically comprises at least one positive electrode (cathode) of elemental sulphur, an organic liquid electrolyte and at least one negative electrode (anode) of lithium metal or a metallic alloy of lithium. The cathode is generally composite, i.e., it is prepared from elemental sulphur and non-electrochemically active additives. Non-electrochemically active additives include an electrical conductor that improves the electronic conductivity of the cathode since sulphur is an electrical insulator. These additives can also include a polymer binder that ensures cohesion among the various materials of the cathode.

Starting from an elemental sulphur cathode and a lithium metal anode, the electrochemical cell is initially in the charged state. In discharge, the elemental sulphur of the cathode is reduced to lithium sulfide $Li_2S$ and lithium metal or a metallic alloy of lithium oxide at the anode. The following reactions occur at the electrodes:

Cathode: $S_8 + 16\ e^- \longrightarrow 8\ S^{2-}$
Anode: $Li \longrightarrow Li^+ + e^-$ The overall cell discharge reaction is: $16\ Li + S_8 \longrightarrow 8\ Li_2S$ During the reduction of the sulphur that occurs when the cell discharges, cyclic sulphur molecules (in the form of octasulphur $S_8$) are reduced and form linear lithium polysulfide chains, of general formula $Li_2S_n$, n generally ranging from 2 to 8. The first compounds formed during the discharge of the cell are long-chain lithium polysulfides, such as $Li_2S_8$ or $Li_2S_6$.

Unlike a lithium-ion electrochemical cell, a lithium/sulphur electrochemical cell typically comprises an electrolyte for which the solvent is ether-based. Ethers, such as 1,3-dioxolane or tetrahydrofuran have been used for several decades and allow substantial solubilization of lithium polysulfides. Glyme type organic solvents of the general formula $H-[O-CH_2-CH_2]_n-OH$, such as 1,2-dimethoxyethane (DME), are also frequently used as electrolyte solvent.

Long-chain lithium polysulfides, such as $Li_2S_8$ or $Li_2S_6$, are dissolved in the electrolyte during discharge of the cell and are likely—in the event of accidental opening of the cell container and contact of the electrolyte or electrodes with ambient air—to react with the moisture contained in ambient air, and thus lead to the formation of hydrogen sulfide, a toxic gas.

Therefore an electrochemical cell is sought that, in the event the electrolyte leaks from the container of this cell or a cathode comes into contact with ambient air, emits as little hydrogen sulfide as possible.

It is also sought for this electrochemical cell to retain a high mass capacity, i.e., greater than or equal to 1500 mAh/g of sulphur.

Document WO 2016/192111 describes a lithium/sulphur electrochemical cell comprising a cathode comprising a composite material comprising microporous carbon and sulphur. In the example of this document, the electrolyte contains a salt which is lithium hexafluorophosphate ($LiPF_6$). This document aims to provide a cell having high coulombic efficiency and stable capacity under cycling conditions. It does not aim to reduce the quantity of hydrogen sulfide likely to be emitted in the event of accidental opening of the cell container.

Document JP 2015-115270 describes a lithium/sulphur electrochemical cell for which the electrolyte comprises an ether-based solvent and a salt made up of lithium bis(fluorosulfonyl)imide LiFSI. This document aims to prevent degradation of electrical performance of the cell in charge and in discharge. It is indicated that dioxolane, which is part of the cyclic ether family, can advantageously be used as an electrolyte solvent for the purpose of stabilizing the electrical performance of the cell in charge and in discharge. This document also does not aim to reduce the quantity of hydrogen sulfide likely to be emitted in the event of accidental opening of the cell container.

SUMMARY OF THE INVENTION

The invention proposes a lithium/sulphur electrochemical cell comprising:

a) a cathode comprising:
  i) carbon having a porous structure comprising pores with a mean diameter less than or equal to 6 nm;
  ii) sulphur with a degree of oxidation that can range from 0 to −2 in the pores of the carbon;
b) an electrolyte comprising:
  i) at least one organic solvent which is a carbonate;
  ii) one or more salts, at least one salt being lithium bis(fluorosulfonyl)imide (LiFSI);
c) an anode comprising lithium metal or a metallic alloy of lithium.

Surprisingly, it was discovered that the use in the cathode of carbon having a porous structure comprising pores with a mean diameter less than or equal to 6 nm in combination with an electrolyte comprising at least one carbonate and at least one lithium bis(fluorosulfonyl)imide (LiFSI) salt allowed significantly reducing the quantity of hydrogen sulfide likely to be emitted by the cell in the event of accidental exposure of the electrolyte or electrodes to moisture.

According to one embodiment, the carbon has a porous structure comprising pores with a mean diameter less than or equal to 3 nm or less than or equal to 2 nm.

According to one embodiment, at least 50% or at least 75% of the porous volume is made up of pores with a diameter less than or equal to 6 nm.

According to one embodiment, at least 50% or at least 75% of the porous volume is made up of pores with a diameter less than or equal to 2 nm.

According to one embodiment, the sulphur is solid elemental sulphur and:

the mass of the solid elemental sulphur represents from 30 to 80% or 55 to 65% of the sum of the masses of the solid elemental sulphur and carbon;

the mass of the carbon represents from 70 to 20% or 45 to 35% of the sum of the masses of the solid elemental sulphur and carbon;

According to one embodiment, the cathode comprises at least one binder and at least one electrical conductor compound and the sulphur is solid elemental sulphur and:

the mass of the solid elemental sulphur represents from 30 to 80% of the sum of the masses of the solid elemental sulphur, the carbon, said at least one binder and said at least one electrical conductor compound;

the mass of the carbon represents from 10 to 60% of the sum of the masses of the solid elemental sulphur, the carbon, said at least one binder and said at least one electrical conductor compound;

the mass of said at least one binder represents from 3 to 8% of the sum of the masses of the solid elemental sulphur, the carbon, said at least one binder and said at least one electrical conductor compound;

the mass of said at least one electrical conductor compound represents from 2 to 7% of the sum of the masses of the solid elemental sulphur, the carbon, said at least one binder and said at least one electrical conductor compound;

According to one embodiment, the electrolyte comprises a first organic solvent that is a cyclic carbonate and a second organic solvent that is a linear carbonate.

According to one embodiment, the volume of the cyclic carbonate(s) represents from 10 to 50% or 15 to 25% of the total volume of organic solvents;

the volume of the linear carbonates) represents from 50 to 90% or 75 to 85% of the total volume of organic solvents.

According to one embodiment, the cyclic carbonate is monosubstituted by fluorine.

According to one embodiment, the electrolyte does not comprise any ester and/or does not comprise any ether.

According to one embodiment, the cyclic carbonate is ethylene carbonate, optionally monosubstituted by fluorine, and the linear carbonate is dimethyl carbonate.

According to one embodiment, 20% at most of the porous volume of the carbon or 10% at most of the porous volume of the carbon is made up of pores with a diameter greater than 6 nm and ranging up to 50 nm.

DESCRIPTION OF EMBODIMENTS

Figure 1:
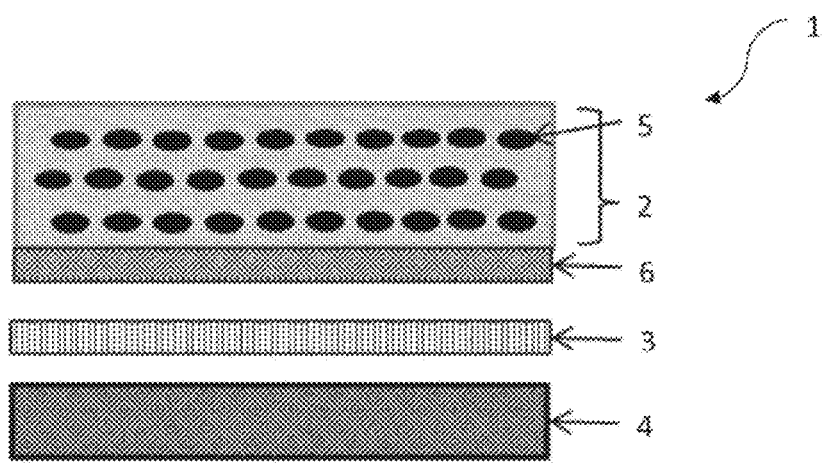
FIG. 1 shows an exploded schematic sectional view of a stack of a cathode, a separator and an anode in an electrochemical cell according to the invention.

The various constituents of an electrochemical cell according to the invention will be described below.

Cathode:

The cathode is a composite prepared from electrochemically-active solid elemental sulphur and non-electrochemically active compounds.

Solid elemental sulphur exists in different molecular forms. The preferred form is alpha sulphur $S\alpha$, of formula $S_8$ corresponding to cyclooctasulphur, which is the most thermodynamically-stable form.

Non-electrochemically active compounds comprise:

carbon having a porous structure comprising pores with a mean diameter less than or equal to 6 nm and generally at least one electrical conductor compound and at least one binder.

The mean pore diameter may be less than or equal to 3 nm, or even less than or equal to 2 nm.

The carbon having a porous structure plays the role of electrical percolator. The pores of the porous structure house the elemental sulphur particles.

One possible method for the incorporation of the elemental sulphur particles into the pores of the porous structure of the carbon is as follows. The porous carbon is mixed with the solid elemental sulphur. Typically, the mass of the solid elemental sulphur represents from 30 to 80% or 55 to 65% of the sum of the masses of the solid elemental sulphur and carbon; The mass of the carbon typically represents from 70 to 20% or 45 to 35% of the sum of the masses of solid elemental sulphur and carbon.

The mixture is heated to a temperature close to 155° C. for approximately 5 hours under vacuum, in order to permit the sulphur molecules to penetrate into the open pores of the carbon. At around 155° C., the sulphur in the liquid state has its lowest viscosity.

The mixture is then heated under inert gas at a temperature of approximately 300° C. for approximately 30 minutes, which sublimates the sulphur and eliminates the excess. The product obtained is then generally mixed with at least one binder and at least one compound that is a good electrical conductor.

The binder may be chosen from carboxymethylcellulose (CMC), a butadiene-styrene copolymer (SBR), polytetrafluoroethylene (PTFE), polyamideimide (PAI), polyimide (PI), styrene-butadiene rubber (SBR), poly(acrylic acid) (PAA), polyvinyl alcohol, polyvinylidene fluoride (PVDF) and a mixture thereof.

The electrical conductor compound is generally carbon black.

An ink is obtained that is deposited on one or two faces of a current collector that can be an aluminum strip. The ink-coated current collector is laminated to adjust its thickness. A cathode is thus obtained.

A typical composition of the ink deposited on the current collector can be the following:

from 30 to 80% by mass, preferably 50 to 55% by mass of solid elemental sulphur relative to the sum of the masses of the solid elemental sulphur, the carbon, the binder(s) and the electrical conductor compound(s);

from 10 to 60% by mass, preferably 30 to 35% by mass of solid porous carbon relative to the sum of the masses of the solid elemental sulphur, the carbon, the binder(s) and the electrical conductor compound(s);

from 3 to 8% by mass, preferably 5 to 7% by mass of binder relative to the sum of the masses of the solid elemental sulphur, the carbon, the binder(s) and the electrical conductor compound(s);

from 2 to 7% by mass, preferably 3 to 5% by mass of electrical conductor compound relative to the sum of the masses of the solid elemental sulphur, the carbon, the binder(s) and the electrical conductor compound(s).

The quantity of elemental sulphur is measured in the composite by thermogravimetric analysis after treatment at 300° C.

Anode:

The active material of the anode is a strip made up of lithium metal or a metallic alloy of lithium.

Electrolyte:

The electrolyte is liquid and comprises one or more organic solvents, at least one of these organic solvents being a carbonate, in which one or more salts are dissolved, at least one of these salts being lithium bis(fluorosulfonyl)imide LiFSI of the formula:

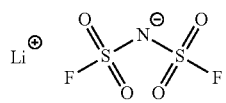

The carbonate can be a cyclic or linear carbonate. The cyclic carbonate can be mono- or multi-substituted by one or more halogen atoms, such as fluorine.

Examples of cyclic carbonates are ethylene carbonate (EC), propylene carbonate (PC) and butylene carbonate (BC). Ethylene carbonate (EC) and propylene carbonate (PC) are preferred. The ethylene carbonate may be mono-substituted by fluorine (FEC). The electrolyte may also contain vinylene carbonate.

Examples of linear carbonates are dimethyl carbonate (DMC), diethyl carbonate (DEC), ethyl methyl carbonate (EMC) and propyl methyl carbonate (PMC). Dimethyl carbonate (DMC) is preferred.

The percentage of carbonate(s) by volume can be greater than or equal to 50%, greater than or equal to 60%, greater than or equal to 70%, greater than or equal to 80% or greater than or equal to 90% of the sum of the organic solvent volumes. Preferably, the electrolyte does not contain any ester and/or does not contain any ether. More preferably still, the electrolyte does not contain any organic solvent other than one or more carbonates.

The electrolyte may comprise a first organic solvent that is a cyclic carbonate and a second organic solvent that is a linear carbonate. Preferably, the electrolyte does not contain any organic solvent other than one or more cyclic carbonate(s) and other than one or more linear carbonate(s).

The volume of said cyclic carbonate(s) can represent from 10 to 50% or 20 to 40% or 15 to 25% of the total volume of organic solvents; The volume of said at least one linear carbonate can represent from 90 to 50% or 80 to 60% or 85 to 75% of the total volume of organic solvents.

The cyclic carbonate may be ethylene carbonate, optionally monosubstituted by fluorine, and the linear carbonate may be dimethyl carbonate.

The electrolyte necessarily contains lithium bis(fluorosulfonyl)imide $LiN(SO_2F)_2$ (LiFSI) but may also contain one or more other salts, such as lithium perchlorate $LiClO_4$, lithium hexafluoroantimonate $LiSbF_6$, hexafluorophosphate $LiPF_6$, lithium tetrafluoroborate $LiBF_4$, lithium hexafluoroarsenate $LiAsF_6$, lithium trifluoromethanesulfonate $LiCF_3SO_3$, lithium bis(trifluoromethanesufonyl)imide $LiN(CF_3SO_2)_2$ (LiTFSI), lithium trifluoromethanesulfonemethide $LiC(CF_3SO_2)_3$ (LiTFSM), bisperfluoroethylsulfonimide $LiN(C_2F_5SO_2)_2$ (LiBETI), lithium 4,5-dicyano-2-(trifluoromethyl) imidazolide (LiTDI), lithium bis(oxalatoborate) (LiBOB), lithium tris(pentafluoroethyl) trifluorophosphate $LiPF_3(CF_2CF_3)_3$ (LiFAP) and mixtures thereof.

The percentage by mass of lithium bis(fluorosulfonyl)imide LiFSI may be greater than or equal to 50%, greater than or equal to 60%, greater than or equal to 70%, greater than or equal to 80%, greater than or equal to 90%, preferably equal to 100% of the sum of the masses of the salts dissolved in the organic solvent(s).

The lithium bis(fluorosulfonyl)imide LiFSI concentration in the electrolyte may be greater than or equal to 1 mol/L or less than or equal to 1 mol/L. It may also comprise between 0.1 and 3 mol/L, or between 0.5 and 1.5 mol/L or even be approximately 1 mol/L.

In order to prepare the electrolyte, the lithium bis(fluorosulfonyl)imide LiFSI salt is dissolved with, optionally, the other lithium salts in said at least one carbonate and, optionally, other organic solvents.

Separator:

A separator prevents electrical contact between an anode and a cathode but nevertheless allows ion transport between the electrodes. The separator material may be chosen from the following materials: a polyolefin, for example polypropylene and polyethylene, a polyester, glass fibers bound together by a polymer, polyimide, polyamide, polyaramid, polyamideimide and cellulose. The polyester may be chosen from polyethylene terephthalate (PET) and polybutylene terephthalate (PBT). Advantageously, the polyester or polypropylene or polyethylene contains or is coated with a material chosen in the group consisting of a metal oxide, a carbide, a nitride, a boride, a silicide and a sulfide. This material may be $SiO_2$ or $Al_2O_3$.

FIG. 1 is an exploded schematic sectional view of a stack of a cathode (2), a separator (3) and an anode (4) in an electrochemical cell (1) according to the invention. The cathode has a porous structure (5). The cathode pores house sulphur. A stable passivation layer (SEI for "solid electrolyte interface") (6) is formed on the surface of cathode (2). It results from the reduction of the cathode chemical species contained in the electrolyte during discharge of the cell.

Preparation of the Electrochemical Bundle:

The electrochemical bundle is formed by interspersing a separator between at least one cathode and at least one anode. The electrochemical bundle is inserted in the cell container. The cell container may be in the parallelepiped or cylindrical format. In this latter case, the electrochemical bundle is coiled to form a cylindrical assembly of electrodes.

Filling the Container:

The container provided with the electrochemical bundle is filled with the electrolyte as described above.

Surprisingly, the Applicant observed that the association of a carbon cathode with a porous structure comprising pores with a mean diameter less than or equal to 6 nm in combination with an electrolyte comprising at least one carbonate and at least one lithium bis(fluorosulfonyl)imide (LiFSI) salt allowed significantly reducing the quantity of hydrogen sulfide that could be emitted in the event of accidental exposure of the cell.

Without wanting to be bound by the theory, the Applicant is of the opinion that during operation of the cell, long-chain lithium polysulfides, such as $Li_2S_5$ or $Li_2S_6$ remain confined in the pores of the carbon and are not present in the electrolyte. Furthermore, the Applicant is of the opinion that the chemical species located in the cathode passivation layer (SEI) in the cell according to the invention have a lower reactivity to water and that this lower reactivity is responsible for the lower emission of hydrogen sulfide.

In addition to the reduction of the quantity of hydrogen sulfide released, the invention allows reducing the quantity of electrolyte contained in the cell, indeed, it is customary when designing a lithium-sulphur cell to provide an excess of electrolyte. This excess serves to compensate for the increase in electrolyte viscosity induced by the dissolution of lithium polysulfides when the cell discharges. Remember that the discharge of a lithium/sulphur cell leads to the formation of lithium polysulfides that dissolve in the electrolyte. This dissolution leads to a reduction of the quantity of active cathode material and an increase of the electrolyte viscosity. The increase of electrolyte viscosity leads, in turn, to a reduction of ionic mobility, detrimental to the smooth functioning of the cell. In order to compensate for the increased viscosity of the electrolyte, it is customary when designing the cell to provide an excess of electrolyte. For example, the ratio between the electrolyte volume and the quantity of sulphur in a conventional lithium-sulphur cell can be at least 5 µL of electrolyte per milligram of sulphur. However, an increase in the quantity of electrolyte penalizes the specific energy and energy density of the electrochemical cell. The invention allows reducing the ratio between the electrolyte volume and the quantity of sulphur, for example by maintaining this ratio at a value less than or equal to 4 µL of electrolyte per milligram of sulphur, and consequently increasing the specific energy and energy density of the cell.

EXAMPLES

Six lithium/sulphur electrochemical cells A-F of 5 mAh capacity were created. The different cathode and electrolyte compositions used to create cells A to F are indicated in Table 1 below.

The carbon used in Examples A and C is available from Akzo Nobel under the tradename Ketjen Black EC 600J.

To characterize the porous volume and the pore size of the carbons, the technique of nitrogen adsorption at 77 K was used. The adsorption and desorption isotherms were measured with a Belsorp Mini II device. The carbon used in Examples A and C has a porous structure comprising pores with a mean diameter of 6.5 nm. The specific surface area developed of this carbon, measured by the Brunauer-Emmet-Teller (BET) method, is 1439 m²/g.

The carbon used in Examples B, D, E, F and G has the following pore distribution:
mesoporous volume (denoted $V_{mesoporous}$ corresponding to the specific volume of the pores with a mean diameter greater than 2 nm and less than 50 nm) equal to 0.1 cm³/g measured according to the "Barrett-Joyner-Halenda" (BJH) method from nitrogen adsorption and desorption isotherms;
microporous volume (denoted $V_{microporous}$ corresponding to the specific volume of the pores with a mean diameter less than or equal to 2 nm) equal to 0.9 cm³/g measured according to the "t-plot" from nitrogen adsorption and desorption isotherms;

The BJH method also allows estimating the mean diameter of the pores associated with the mesoporous volume, which will be denoted $d_{mesoporous}$, from nitrogen adsorption and desorption isotherms.

The Horvath-Kawazoe method also allows estimating the mean diameter of the pores associated with the microporous volume, which will be denoted $d_{microporous}$, from nitrogen adsorption and desorption isotherms.

When the carbon has both a mesoporous and microporous volume, the evaluation of the mean pore diameter of the carbon is calculated by the mean of the microporous and mesoporous diameters weighted by the associated pore volumes according to the following formula:

$$d_{porous\ mean} = ((V_{mesoporous} * d_{mesoporous}) + (V_{microporous} * d_{microporous})) / (V_{mesoporous} + V_{microporous})$$

The mean pore diameter was evaluated at 0.88 nm for the carbon used in Examples B, D, E, F and G. The specific surface area of this carbon, measured by nitrogen adsorption and calculated by the Brunauer-Emmet-Teller (BET) method, is 2163 m²/g.

The carbon of Examples A and C does not have microporous volume. Its mean pore diameter therefore corresponds to $d_{mesoporous}$ measured by the BJH method, which is 6.5 nm.

The solid elemental sulphur used is available from the Sigma-Aldrich company, under reference 215198.

The sulphur and carbon composite was prepared by mixing the carbon with the solid elemental sulphur. The mixture was heated to a temperature of 155° C. for approximately 5 hours under vacuum, in order to permit the sulphur molecules to penetrate into the carbon pores. Heating of the mixture is continued at a temperature of 300° C. for 30 minutes under an inert gas flow in order to eliminate the excess sulphur. The sulphur content of the prepared carbon-sulphur composite is measured by thermogravimetric analysis (TGA) using a TA Instrument Q500 device.

In all the cells, the anode is lithium metal and the separator is a microporous polyolefin membrane sold by the Celgard company under the tradename Celgard® 2500.

TABLE 1

| | Cathode | | | | | |
|---|---|---|---|---|---|---|
| Cell | sulphur (% m**) | mean carbon pore diameter (nm) | percentage of porous carbon (% m**) | electrical conductor compound (% m**) | binder (% m**) | Electrolyte (% vol***) |
| A* | 53 | 6.5 | 32 | 8 | 7 | LiPF$_6$ 1 mol/L in EC/DMC (20/80) |
| B* | 52 | 0.88 | 36 | 5 | 7 | LiPF$_6$ 1 mol/L in EC/DMC (20/80) |
| C* | 53 | 6.5 | 32 | 8 | 7 | LiTFSI 1 mol/L in dimethoxyethane (DME)/dioxolane |

TABLE 1-continued

| Cell | sulphur (% m**) | mean carbon pore diameter (nm) | percentage of porous carbon (% m**) | electrical conductor compound (% m**) | binder (% m**) | Electrolyte (% vol***) |
|---|---|---|---|---|---|---|
| D* | 59 | 0.88 | 29 | 5 | 7 | LiPF$_6$ 1 mol/L in FEC/DMC (20/80) |
| E | 59 | 0.88 | 29 | 5 | 7 | LiFSI 1 mol/L in FEC/DMC (20/80) |
| F* | 53 | 0.88 | 35 | 5 | 7 | LiFSI 1 mol/L in (DME)/dioxolane |
| G | 53 | 0.88 | 35 | 5 | 7 | LiFSI 1 mol/L in FEC/DMC (20/80) |

*example that is not part of the invention
**the percentages are mass percentages expressed relative to the sum of the masses of the cathode constituents except for the current collector.
***the percentages are volume percentages expressed relative to the total volume of organic solvents.

Figure 2:
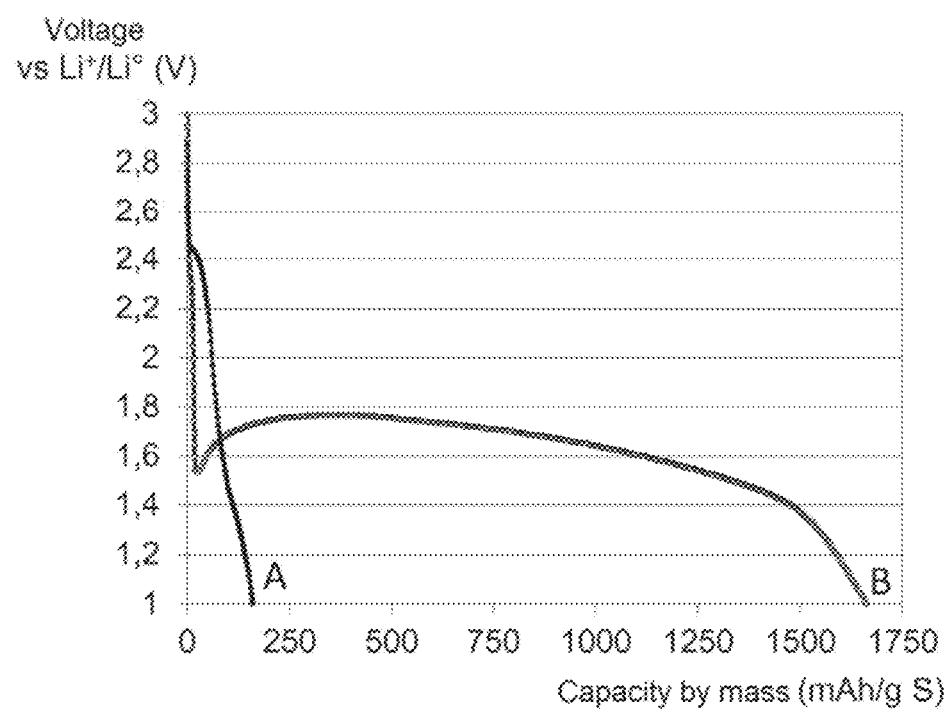
FIG. 2 shows the discharge curves for cells A and B.

A) A first test was conducted on cells A and B for purposes of evaluating the effect of the mean diameter of the carbon pores of the cathode on the discharge performance of the cells. Cells A and B contain the same anode, the same separator and the same electrolyte. The carbon of the cell A cathode has a porous structure comprising pores with a mean diameter of 6.5 nm. The carbon of the cell B cathode has a porous structure comprising pores with a mean diameter of 0.88 nm. The discharge curves of cells A and B were plotted and the initial discharge mass capacities of these cells were measured. The discharge curves are shown in FIG. 2. Cell A has a mass capacity of approximately 150 mAh per gram of sulphur while cell B has a mass capacity of approximately 1645 mAh per gram of sulphur. These results show that a cell comprising a cathode comprising carbon comprising pores with a mean diameter of 6.5 nm and a carbonate-based solvent does not have a high mass capacity.

B) A second test was performed in order to compare the quantities of hydrogen sulfide (H$_2$S) emitted by cells C, D and E. For this purpose, cells C, D and E were discharged until a voltage of 1 V was attained. The low voltage of 1 V allowed maximizing the quantity of sulphur reduced to Li$_2$S at the cathode. The electrodes were then removed from the cells and placed in a closed beaker containing a source of moisture in order to measure the quantity of hydrogen sulfide emitted by the reaction between lithium sulfide Li$_2$S and moisture. The source of moisture consisted of water and acid poured into a beaker. Care was taken not to wash the surface of the electrodes in order not to eliminate any deposit of products that would be present at the electrode surface. The electrodes were dried before exposure to the source of moisture.

Figure 3:
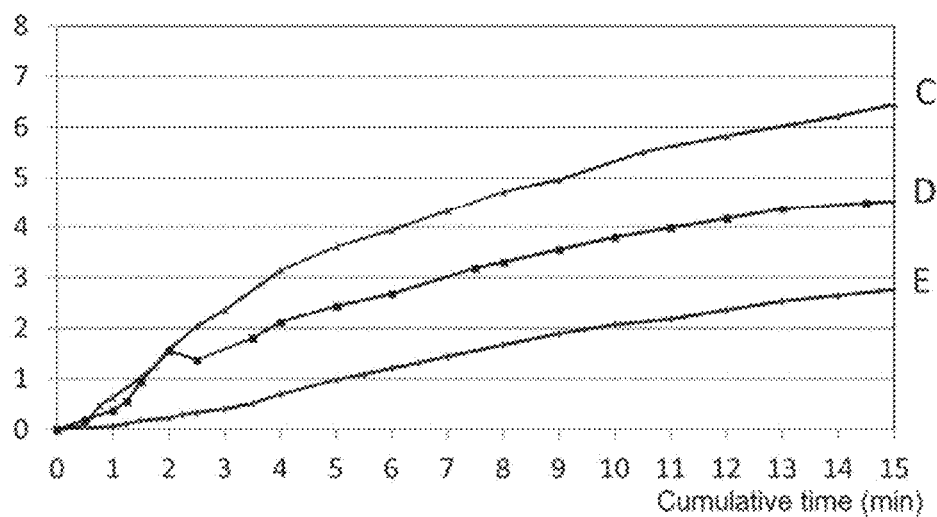
FIG. 3 shows the cumulative quantities of hydrogen sulfide emitted by the electrodes of cells C, D and E exposed to moisture.

The cumulative quantities of hydrogen sulfide were recorded over time and are shown in FIG. 3. It is observed that the electrode of cell E according to the invention is the one that emits the lowest quantity of hydrogen sulfide. It appears that the compounds resulting from the reduction of sulphur during discharge remain in the cathode pores.

Cells D and E differ only by the nature of the electrolyte salt, which is LiPF$_6$ for cell D and LiFSI for cell E. Comparison between the results obtained with cell D and those obtained with cell E show that the replacement of LiPF$_6$ with LiFSI permitted reducing the quantity of hydrogen sulfide emitted. The lowest quantity of hydrogen sulfide emitted by cell E shows that the invention permits reducing the toxicity risk for a user.

Figure 4:
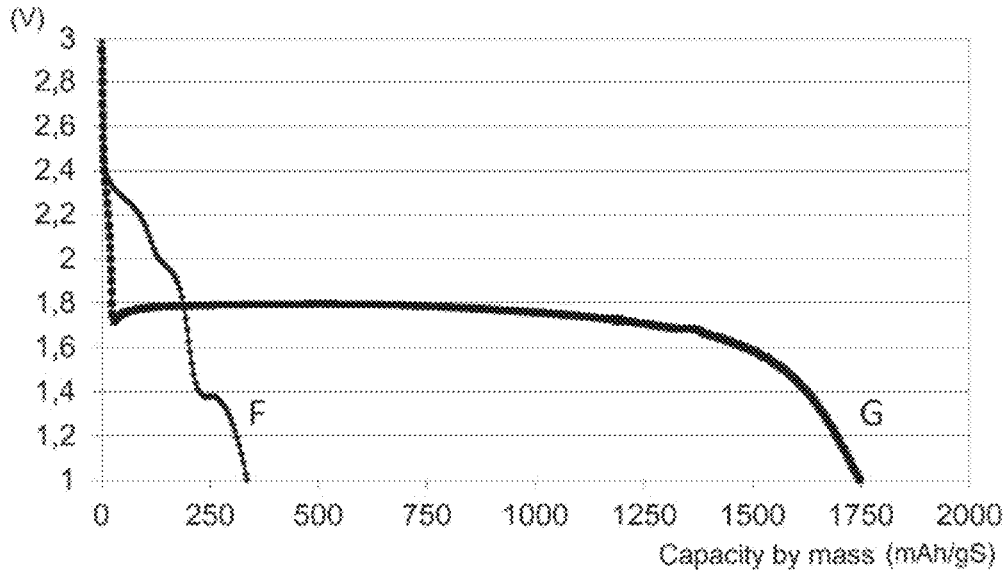
FIG. 4 shows the discharge curves for cells F and G.

C) A third test was conducted on cells F and G. Cells F and G differ by the nature of the organic solvents of the electrolyte. The organic solvents of cell G are ethylene monofluorocarbonate and dimethyl carbonate, which are part of the carbonate family. The organic solvents of cell F are 1,2-dimethoxyethane (DME) and dioxolane, which are part of the ether family. The discharge curves of cells F and G were plotted and the initial mass discharge capacities of these cells were measured. The discharge curves are shown in FIG. 4. Cell G has a mass capacity of approximately 1750 mAh per gram of sulphur while cell F has a mass capacity of approximately 330 mAh per gram of sulphur, much less than that of cell F. These results show that the use of an ether-based organic solvent does not allow obtaining a sufficient mass capacity.

The invention claimed is:
1. Lithium/sulphur electrochemical cell (1) comprising:
   a) a cathode comprising:
      i) carbon having a porous structure (5) comprising pores with a mean diameter less than or equal to 6 nm;
      ii) sulphur with a degree of oxidation that can range from 0 to −2 in the pores of the carbon;
   b) an electrolyte comprising:
      i) at least one organic solvent which is a carbonate;
      ii) one or more salts, at least one salt being lithium bis (fluorosulfonyl) imide (LiFSI),
   the percentage by mass of lithium bis (fluorosulfonyl) imide being greater than or equal to 50% of the sum of the masses of the one or more salts,
   the electrolyte being devoid of any ether;
   c) an anode comprising lithium metal or a metallic alloy of lithium, and
   wherein the electrolyte does not comprise any ester.
2. Electrochemical cell according to claim 1, wherein the carbon has a porous structure comprising pores with a mean diameter less than or equal to 3 nm.
3. Electrochemical cell according to claim 2, wherein the carbon has a porous structure comprising pores with a mean diameter less than or equal to 2 nm.

4. Electrochemical cell according to claim 1, wherein at least 50% of a porous volume of the porous structure of the cathode carbon is made up of pores with a diameter less than or equal to 6 nm.

5. Electrochemical cell according to claim 4, wherein at least 75% of the porous volume of the porous structure of the cathode carbon is made up of pores with a diameter less than or equal to 6 nm.

6. Electrochemical cell according to claim 1, wherein at least 50% of a porous volume of the porous structure of the cathode carbon is made up of pores with a diameter less than or equal to 2 nm.

7. Electrochemical cell according to claim 6, wherein at least 75% of the porous volume of the porous structure of the cathode carbon is made up of pores with a diameter less than or equal to 2 nm.

8. Electrochemical cell according to claim 1, wherein the sulphur is solid elemental sulphur and:
- the mass of the solid elemental sulphur represents from 30 to 80% of the sum of the masses of the solid elemental sulphur and carbon;
- the mass of the carbon represents from 70 to 20% of the sum of the masses of the solid elemental sulphur and carbon.

9. Electrochemical cell according to claim 8 wherein:
- the mass of the solid elemental sulphur represents from 55 to 65% of the sum of the masses of the solid elemental sulphur and carbon;
- the mass of the carbon represents from 45 to 35% of the sum of the masses of the solid elemental sulphur and carbon.

10. Electrochemical cell according to claim 1, wherein the cathode further comprises at least one binder and at least one electrical conductor compound and the sulphur is solid elemental sulphur and:
- the mass of the solid elemental sulphur represents from 30 to 80% of the sum of the masses of the solid elemental sulphur, the carbon, said at least one binder and said at least one electrical conductor compound;
- the mass of the carbon represents from 10 to 60% of the sum of the masses of the solid elemental sulphur, the carbon, said at least one binder and said at least one electrical conductor compound;
- the mass of said at least one binder represents from 3 to 8% of the sum of the masses of the solid elemental sulphur, the carbon, said at least one binder and said at least one electrical conductor compound;
- the mass of said at least one electrical conductor compound represents from 2 to 7% of the sum of the masses of the solid elemental sulphur, the carbon, said at least one binder and said at least one electrical conductor compound.

11. Electrochemical cell according to claim 1, wherein the electrolyte comprises a first organic solvent that is a cyclic carbonate and a second organic solvent that is a linear carbonate.

12. Electrochemical cell according to claim 11 wherein:
- the volume of the cyclic carbonate(s) represents from 10 to 50% of the total volume of organic solvents;
- the volume of the linear carbonate(s) represents from 50 to 90% of the total volume of organic solvents.

13. Electrochemical cell according to claim 12 wherein:
- the volume of the cyclic carbonate(s) represents from 15 to 25% of the total volume of organic solvents;
- the volume of the linear carbonate(s) represents from 75 to 85% of the total volume of organic solvents.

14. Electrochemical cell according to claim 11, wherein the cyclic carbonate is monosubstituted by fluorine.

15. Electrochemical cell according to claim 11, wherein the cyclic carbonate is ethylene carbonate, optionally monosubstituted by fluorine, and the linear carbonate is dimethyl carbonate.

16. Electrochemical cell according to claim 1, wherein at most 20% of a porous volume of the porous structure of the cathode carbon is made up of pores with a diameter greater than or equal to 6 nm and ranging up to 50 nm.

17. Electrochemical cell according to claim 16, wherein at most 10% of the porous volume of the porous structure of the cathode carbon is made up of pores with a diameter greater than or equal to 6 nm and ranging up to 50 nm.

18. Electrochemical cell according to claim 1 wherein:
- at least 75% of a porous volume of the porous structure of the cathode carbon is made up of pores with a diameter less than or equal to 2 nm,
- the mass of the solid elemental sulphur represents from 30 to 80% of the sum of the masses of the solid elemental sulphur and carbon,
- the mass of the carbon represents from 70 to 20% of the sum of the masses of the solid elemental sulphur and carbon,
- the electrolyte comprises a first organic solvent that is a monofluoroethylene carbonate and a second organic solvent that is dimethylcarbonate,
- the volume of the monofluoroethylene carbonate represents from 15 to 25% of the total volume of organic solvents;
- the volume of the dimethylcarbonate represents from 75 to 85% of the total volume of organic solvents, and
- LiFSI is the sole salt.

19. Electrochemical cell according to claim 18 wherein:
- the mass of the solid elemental sulphur represents from 55 to 65% of the sum of the masses of the solid elemental sulphur and carbon,
- the mass of the carbon represents from 45 to 35% of the sum of the masses of the solid elemental sulphur and carbon.

* * * * *